(12) United States Patent
Schmalz et al.

(10) Patent No.: US 11,884,398 B2
(45) Date of Patent: Jan. 30, 2024

(54) AIRCRAFT LAVATORY SYSTEMS

(71) Applicant: B/E Aerospace, Inc., Winston Salem, NC (US)

(72) Inventors: Brian Schmalz, Leawood, KS (US); Mudar Abu-Saymeh, Olathe, KS (US)

(73) Assignee: B/E Aerospace, Inc., Winston Salem, NC (US)

( * ) Notice: Subject to any disclaimer, the term of this patent is extended or adjusted under 35 U.S.C. 154(b) by 238 days.

(21) Appl. No.: 17/339,404

(22) Filed: Jun. 4, 2021

(65) Prior Publication Data

US 2021/0380251 A1 Dec. 9, 2021

Related U.S. Application Data

(60) Provisional application No. 63/035,257, filed on Jun. 5, 2020.

(51) Int. Cl.
  *G06Q 10/02* (2012.01)
  *H04W 68/00* (2009.01)
  *B64D 11/00* (2006.01)

(52) U.S. Cl.
  CPC ......... *B64D 11/0015* (2013.01); *G06Q 10/02* (2013.01); *H04W 68/00* (2013.01)

(58) Field of Classification Search
  CPC .... B64D 11/0015; G06Q 10/02; H04W 68/00
  USPC ...................................................... 340/945
  See application file for complete search history.

(56) References Cited

U.S. PATENT DOCUMENTS

| 6,329,919 | B1 | 12/2001 | Boies et al. |
| 7,535,367 | B2 | 5/2009 | Ratnakar |
| 2002/0022896 | A1 | 2/2002 | Dugan |
| 2009/0112638 | A1 | 4/2009 | Kneller et al. |
| 2017/0066534 | A1* | 3/2017 | Sharma ................. B64D 11/06 |
| 2017/0069194 | A1* | 3/2017 | Sharma ................. B64D 11/06 |
| 2021/0170871 | A1* | 6/2021 | Di Censo ............ B60R 11/0235 |

FOREIGN PATENT DOCUMENTS

CN    106127323    * 11/2016

OTHER PUBLICATIONS

English Translation of CN106127323 Nov. 2016.*
Extended European search report issued in corresponding application No. 21178078.8, dated Nov. 10, 2021 (7 pages).
European Communication Pursuant to Art. 94(3) EPC, dated Jun. 2, 2023, issued during the prosecution of European Patent Application No. EP21178078.8, 6 pages.

* cited by examiner

*Primary Examiner* — Ted M Wang
(74) *Attorney, Agent, or Firm* — Locke Lord LLP; Daniel J. Fiorello (57) ABSTRACT

A queue system for a lavatory of an aircraft can include a queue module configured to receive a request from a user input device and to create and/or modify a virtual lavatory queue based on a request hierarchy of the request to position the request in the virtual lavatory queue, and a sensor operatively connected to the queue module and configured to output a state change signal indicative of a user leaving the lavatory. The queue module can be configured to receive the state change signal, iterate the virtual lavatory queue in response to the state change signal, and output a vacancy indicator signal to an indicator device associated with a request that is at a front of the virtual lavatory queue after iterating the virtual lavatory queue to indicate to a user that it is the user's turn in the queue.

16 Claims, 5 Drawing Sheets

AIRCRAFT LAVATORY SYSTEMS

CROSS-REFERENCE TO RELATED APPLICATIONS

This application claims priority to and the benefit of U.S. Provisional Application No. 63/035,257, filed Jun. 5, 2020, the entire contents of which are herein incorporated by reference in their entirety.

FIELD

This disclosure relates to aircraft systems.

BACKGROUND

In traditional aircraft, passengers who desire to use the lavatory frequently congregate in a line at the lavatory door. This is both inefficient, adds risk to those standing in line, and can cause people to stand close together, eliminating desired social distancing for example.

Such conventional methods and systems have generally been considered satisfactory for their intended purpose. However, there is still a need in the art for improved aircraft lavatory systems. The present disclosure provides a solution for this need.

SUMMARY

A queue system for a lavatory of an aircraft can include a queue module configured to receive a request from a user input device and to create and/or modify a virtual lavatory queue based on a request hierarchy of the request to position the request in the virtual lavatory queue, and a sensor operatively connected to the queue module and configured to output a state change signal indicative of a user leaving the lavatory. The queue module can be configured to receive the state change signal, iterate the virtual lavatory queue in response to the state change signal, and output a vacancy indicator signal to an indicator device associated with a request that is at a front of the virtual lavatory queue after iterating the virtual lavatory queue to indicate to a user that it is the user's turn in the queue.

In certain embodiments, the user input device can be a personal electronic device (e.g., a smart phone or tablet) of a user. The indicator device can also be the personal electronic de-vice of a user. In certain embodiments, the user input device can be a button or switch (e.g., physical or digital). In certain embodiments, the user input device and/or indicator device can be a passenger infotainment system (e.g., integrated into a seat back). In certain embodiments, the indicator device can be an indicator light configured to change state when receiving the vacancy indicator signal.

The sensor can be a lavatory door sensor configured to output the state change signal when the lavatory door is unlocked and/or opened after being locked and/or closed. Any other suitable sensor (e.g., one or more cameras, one or more lavatory exit switches) is contemplated herein.

In certain embodiments, the request hierarchy can be a time-received logic such that a position of a request is based on a time the request was received (e.g., and timestamped) such that a later request is further back in the virtual lavatory queue. Any other or additional suitable hierarchy to order/reorder the requests in the queue is contemplated herein (e.g., based on an urgency indication, a medical condition, a user request, a seat class type).

The queue module can be hosted on an aircraft network device (e.g., a server) and configured to receive requests and/or send vacancy indications over an aircraft wireless network. Any other suitable location(s) for the queue module is contemplated herein.

In certain embodiments, the system can include the user input device configured to output a request and the indicator device configured to receive a vacancy indication signal. In certain embodiments, the system does not include either, or one of the two. In certain embodiments, the user input device and the indicator device can be integrated together (e.g., be the same device or hosted on the same device).

In certain embodiments, the system can include a verification module operatively connected to the queue module and configured to verify a user attempting to use the lavatory is associated with the request that is at the front of the queue. In certain embodiments, the verification module can be configured to control a lock state and/or an open/close state such that if the verification verifies the user attempting to use the lavatory is associated with a request that is at the front of the queue, the verification module is configured to unlock and/or open a lavatory door.

The verification module can be configured to receive and compare identification data from the user to stored identification data associated with the request that is at the front of the queue. The identification data can include a barcode associated with the request, boarding pass data associated with a user who is associated with the request, or biometric data associated with a user who is associated with the request.

In accordance with at least one aspect of this disclosure, a queue system for a lavatory of an aircraft can include a user input device configured to output a request to use an aircraft lavatory associated with a user, an aircraft network device having a queue module configured to receive the request from the user input device and to create and/or modify a virtual lavatory queue based on a re-quest hierarchy of the request to position the request in the virtual lavatory queue, a sensor operatively connected to the queue module and configured to output a state change signal indicative of a user leaving the lavatory, and an indicator device associated with each request configured to indicate to a next user that it is the user's turn in the queue. The queue module can be configured to receive the state change signal from the sensor; iterate the virtual lavatory queue in response to the state change signal, and output a vacancy indicator signal to the indicator device associated with a request that is at a front of the virtual lavatory queue after iterating the virtual lavatory queue. The queue module and any other component can be as disclosed herein, e.g., as described above. For example, in certain embodiments, the user input device and the indicator device can be integrated and/or are the same device.

In accordance with at least one aspect of this disclosure, a non-transitory computer readable medium can have computer executable instructions configured to be executed by a computer to cause the computer to perform a method. The method can include receiving a request to use an aircraft lavatory from an aircraft occupant, placing the request in a queue, receiving a state change signal indicative of a previous user leaving the lavatory, iterating the queue forward by one request in response to the state change signal, and indicating to the user that the user's turn to use the lavatory when the request is at the front of the queue. The method can further include verifying a user attempting to enter the lavatory is the user associated with the request that is at the front of the queue.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
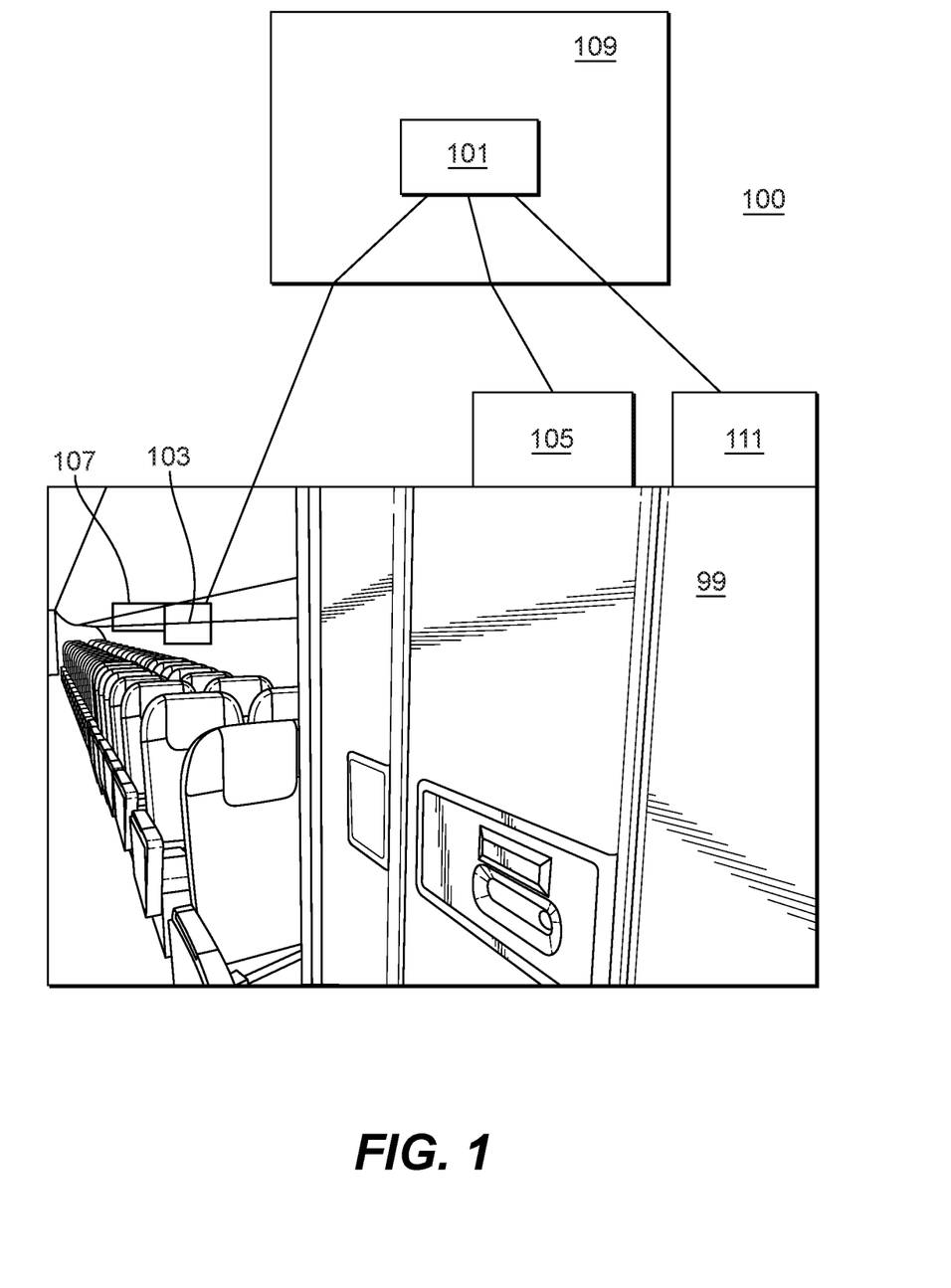
FIG. 1 is a schematic of an embodiment of a system in accordance with this disclosure.
Figure 2:
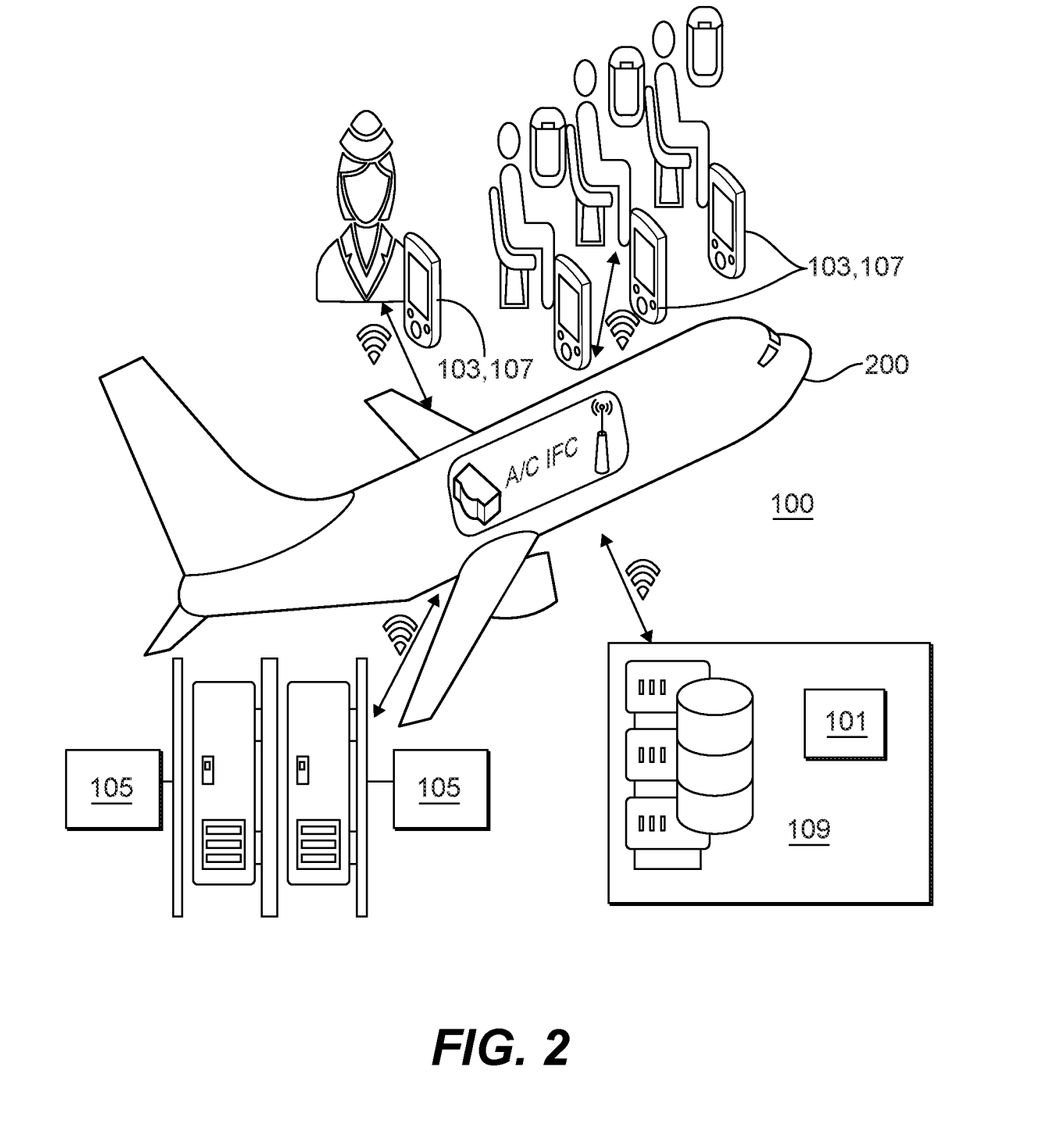
FIG. 2 is an aircraft schematic shown an example implementation of the embodiment of FIG. 1.
Figure 3A:
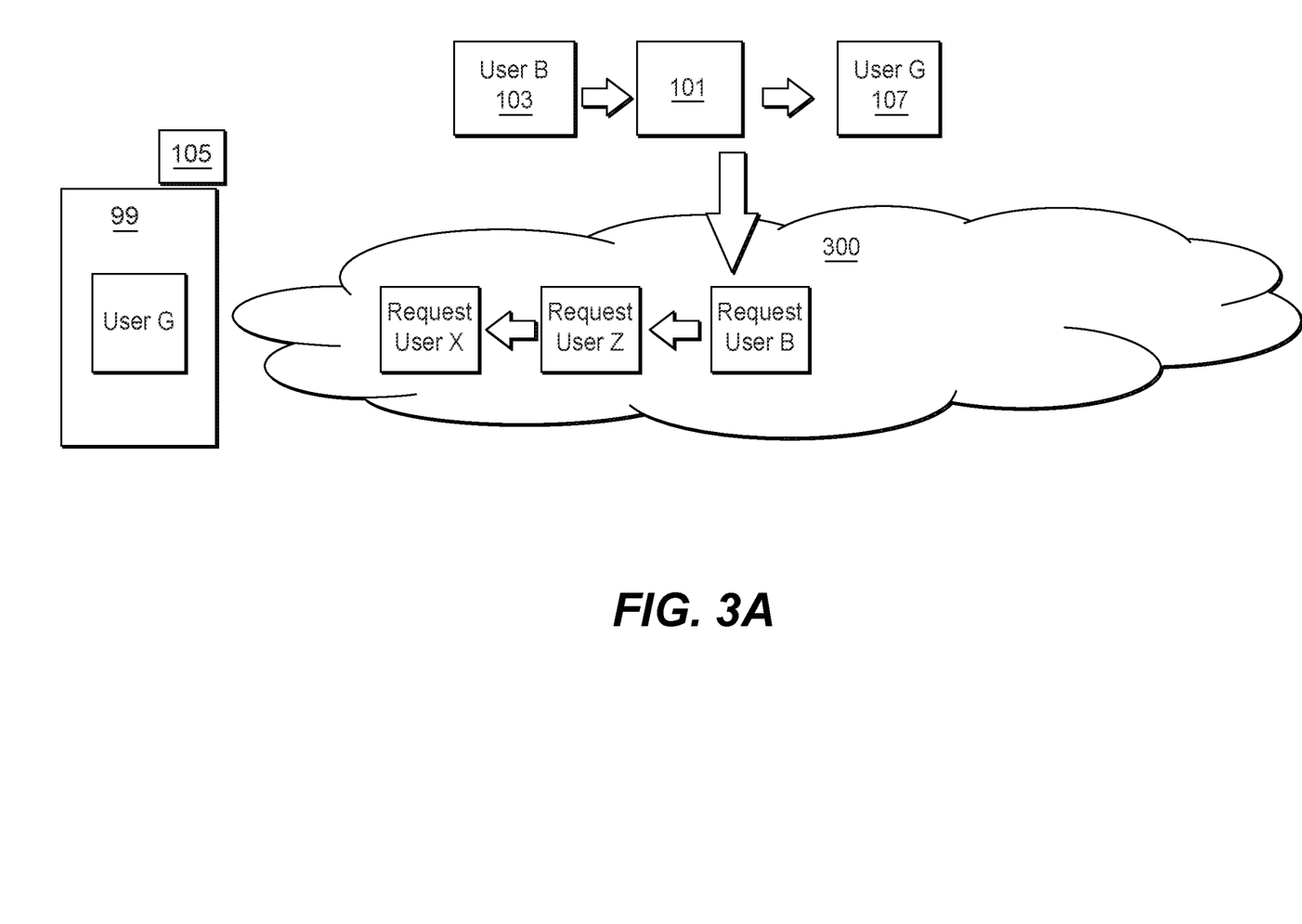
FIGS. 3A, 3B, and 3C are a schematics conceptually showing an embodiment of a virtual lavatory queue and a respective output by a queue module as the queue module iterates through the queue, for example.
Figure 3B:
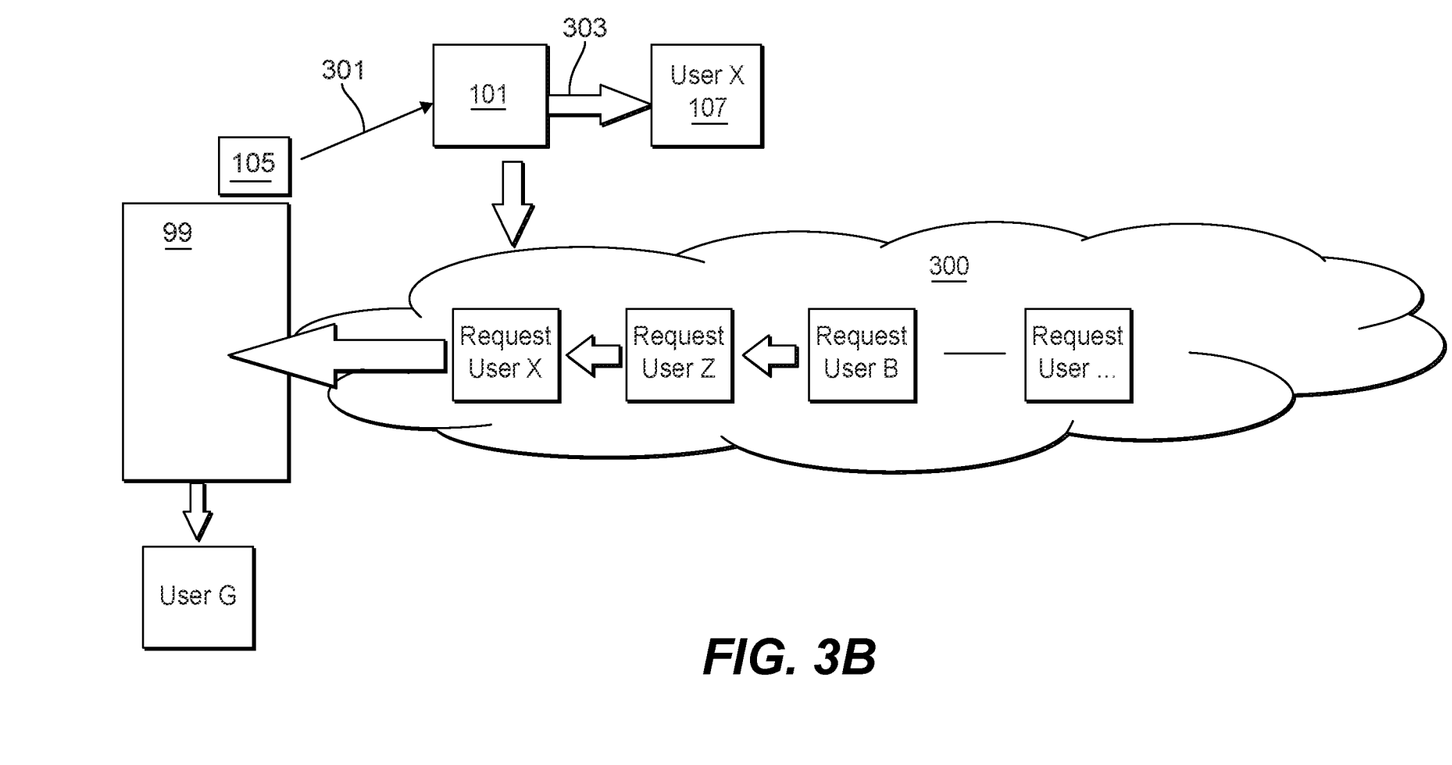
Figure 3C:
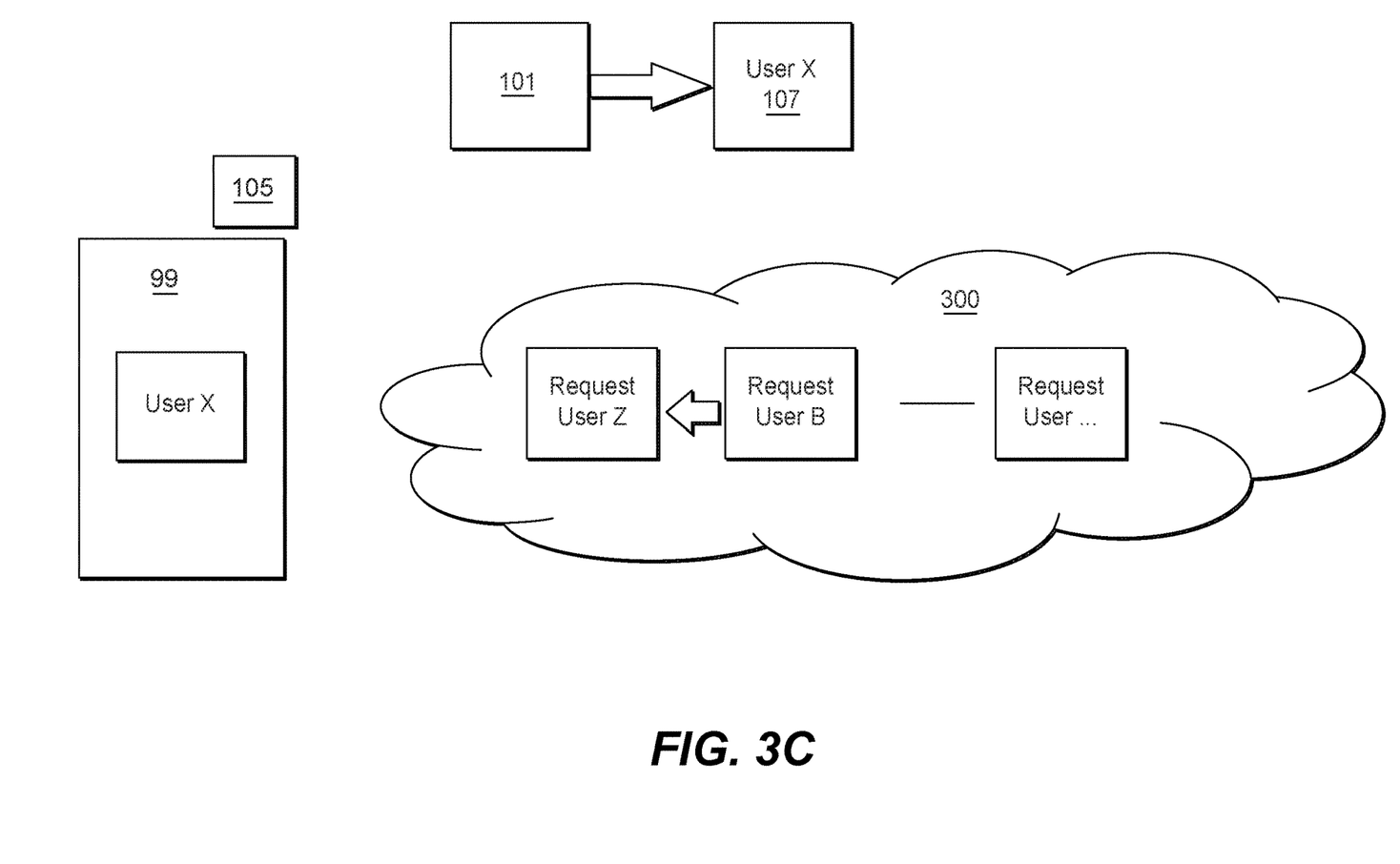

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIGS. 2-3C. Certain embodiments described herein can be used to provide organization and prevent congregation in the aisle of an aircraft near a lavatory, for example.

Referring to FIGS. 1 and 2, and additionally to FIGS. 3A-3C, a queue system 100 for a lavatory 99 of an aircraft 200 (e.g., as shown in FIG. 2) can include a queue module 101 configured to receive a request from a user input device 103 and to create and/or modify a virtual lavatory queue 300 (e.g., as shown in FIG. 3A) based on a request hierarchy (e.g., a time of receipt) of the request to position the request (and thus the user) in the virtual lavatory queue 300. The system 100 can also include a sensor 105 operatively connected to the queue module 101 and configured to output a state change signal 301 (e.g., as shown in FIG. 3B) indicative of a user leaving the lavatory 99.

The queue module 101 can be configured to receive the state change signal 301 from the sensor 105, iterate the virtual lavatory queue 300 in response to the state change signal 301, and output a vacancy indicator signal 303 to an indicator device 107 associated with a request that is at a front of the virtual lavatory queue 300 after iterating the virtual lavatory queue 300 to indicate to a user that it is the next user's turn in the queue 300 (e.g., User X as shown in FIG. 3B).

In certain embodiments, the user input device 103 can be a personal electronic device (e.g., a smart phone or tablet) of a user (e.g., as shown in FIG. 2). The indicator device 107 can also be the personal electronic device of a user, e.g., as shown in FIG. 2. In certain embodiments, the system can include an app configured to operate on the personal electronic devices of the users to allow the users' devices to connect to the queue module 101, send requests, and receive indications. Any suitable request signal (e.g., a simple electrical signal, a data signal having specific request information) suitable to convey a request is contemplated herein.

In certain embodiments, the vacancy indication signal 303 can include a simple binary indication that it is time for the user to proceed to the lavatory. In certain embodiments, the vacancy indication signal can include other suitable information. For example, in an aircraft having multiple lavatories (e.g., with a sensor for each lavatory), in certain embodiments, the vacancy indication signal 303 can include an indication of which lavatory is assigned to the user that is next in line, or an indication of which of the multiple lavatories are available for use (as it is not necessary to assign a specific lavatory for the queue module to continue to function). Any suitable indication signals (e.g., a simple electrical signal, a data signal having specific indication information) suitable to convey an indication to a user is contemplated herein.

In certain embodiments, the user input device 103 can be a button or switch (e.g., physical or digital), for example, over head or on a seat back, e.g., as shown in FIG. 1. In certain embodiments, the user input device 103 and/or indicator device 107 can be a passenger infotainment system (e.g., integrated into a seat back). In certain embodiments, the indicator device 107 can be an indicator light configured to change state (e.g., from red to green) when receiving the vacancy indicator signal 303. Any suitable input device and indicator device is contemplated herein.

The sensor 105 can be a lavatory door sensor configured to output the state change signal when the lavatory door is unlocked and/or opened after being locked and/or closed. For example, the sensor 105 can be configured to sense if the lavatory door is ajar or unlocked. The queue module 101 can be configured to determine that if the lavatory door is open or unlocked for a certain threshold period of time (e.g., 15 seconds, 30 seconds, 1 minute, etc.), the previous user has left and the queue 300 can be iterated. The queue module 101 can be configured to determine that if the door is closed and/or locked for a threshold period of time (e.g., 15 seconds, 30 seconds, 1 minute, etc.), then once the door is next opened, the queue module 101 can immediately, or with a suitable delay for allowing the user to travel back to their seat, iterate the queue 300 to notify the next user waiting in the virtual queue (e.g., User Z in FIG. 3C). Any other suitable sensor (e.g., one or more cameras, one or more lavatory exit switches, a flush sensor, a motion sensor) is contemplated herein. Any suitable logic (e.g., flush plus 30 seconds) to determine vacancy of a lavatory is contemplated herein.

In certain embodiments, the request hierarchy can be a time-received logic such that a position of a request is based on a time the request was received (e.g., and timestamped) such that a later request is further back in the virtual lavatory queue 300 (e.g., as shown in FIG. 3A, the request associated with User B was received after the request associated with User Z, and thus put in line behind User Z). Any other or additional suitable hierarchy to order/reorder the requests in the queue is contemplated herein (e.g., based on an urgency indication, a medical condition, a user request, a seat class type). For example, a certain lavatory my provide priority access to certain users (e.g., first class users get priority at lavatory in the forward cabin). It is contemplated that a user can cancel or otherwise modify their request (e.g., to remove themselves from the virtual queue, causing the queue module 101 to iterate all requests behind the cancelled request forward one space).

As shown in FIG. 2, the queue module 101 can be hosted on an aircraft network device 109 (e.g., a server) and configured to receive requests and/or send vacancy indications over an aircraft wireless network. (e.g., a local network). Any other suitable location(s) for the queue module 101 is contemplated herein.

In certain embodiments, the system 100 can include the user input device 103 configured to output a request and the indicator device 107 configured to receive a vacancy indication signal. In certain embodiments, the system 100 does not include either, or one of the two. In certain embodiments, the user input device 103 and the indicator device 107 can be integrated together (e.g., be the same device or hosted on the same device), such as a touch screen device (a personal electronic device, or a mounted touch screen infotainment system, for example).

In certain embodiments, the system 100 can include a verification module 111 operatively connected to the queue module 101 and configured to verify a user attempting to use the lavatory is associated with the request that is at the front of the queue 300 (e.g., that the next person attempting to use the lavatory after User G is User X as shown in FIG. 3B). In certain embodiments, the verification module 111 can be configured to control a lock state (e.g., a motorized lock) and/or an open/close state (e.g., a motorized controllable door) such that if the verification module 111 verifies the user attempting to use the lavatory is associated with a request that is at the front of the queue, the verification module 111 is configured to unlock and/or open a lavatory door. Such a verification module 111 can be useful to ensure the integrity of the virtual queue system, but strict enforcement may not be necessary. For example, even if someone skips the line, it is contemplated that the queue module 101 can determine that the user is not a verified user, push the queue 300 back one space, and inform the next user in the queue 300 that the lavatory is occupied again and to wait. While verification and enforcement is not necessary, verification alone can be helpful in ensuring when a requesting user has verifiably used the lavatory, that their request can be removed from the queue 300. It is contemplated that aged requests that do not verify within a threshold time after iterating to the front of the queue 300 can be removed and the queue 300 iterated forward.

In certain embodiments, the verification module 111 can be configured to receive and compare identification data from the user to stored identification data (e.g., stored in the network device 109) associated with the request that is at the front of the queue 300. The identification data can include a barcode associated with the request (e.g., a QR code provided on an app on a personal electronic device), boarding pass data associated with a user who is associated with the request (e.g., a barcode on the boarding pass), or biometric data (e.g., facial recognition) associated with a user who is associated with the request. Any suitable hardware associated with the verification module 111 to scan the user identification data is contemplated herein (e.g., a camera, a barcode scanner).

In certain embodiments, the queue module 101 can be configured to estimate a time until each user will be able to use the lavatory and provide an indication to each respective user (e.g., via the indicator 107, e.g., in an app where the request was made). For example, the queue module 101 can be configured to assume an average time of use per user and multiply that value by the number of requests in front of a particular user to obtain the estimated time until use. Any other suitable estimations or logic is contemplated herein (e.g., informing each requesting user what their position in the virtual queue is, e.g., in real time, or allowing people to generally view how many people are awaiting to use the lavatory).

Any module(s) disclosed herein (e.g., queue module 101, verification module 103 described above) can include any suitable hardware and/or software module(s) configured to perform the function thereof. Any suitable common or separate hosting of modules, e.g., in whole or in portions over several hardware and/or software module(s), of any modules disclosed herein is contemplated herein.

In accordance with at least one aspect of this disclosure, a queue system, e.g., 100 for a lavatory of an aircraft can include a user input device configured to output a request to use an aircraft lavatory associated with a user, an aircraft network device having a queue module configured to receive the request from the user input device and to create and/or modify a virtual lavatory queue based on a re-quest hierarchy of the request to position the request in the virtual lavatory queue, a sensor operatively connected to the queue module and configured to output a state change signal indicative of a user leaving the lavatory, and an indicator device associated with each request configured to indicate to a next user that it is the next user's turn in the queue. The queue module can be configured to receive the state change signal from the sensor; iterate the virtual lavatory queue in response to the state change signal, and output a vacancy indicator signal to the indicator device associated with a request that is at a front of the virtual lavatory queue after iterating the virtual lavatory queue. The queue module and any other component can be as disclosed herein, e.g., as described above. For example, in certain embodiments, the user input device and the indicator device can be integrated and/or are the same device.

In accordance with at least one aspect of this disclosure, a non-transitory computer readable medium can have computer executable instructions configured to be executed by a computer to cause the computer to perform a method. The method can include receiving a request to use an aircraft lavatory from an aircraft occupant, placing the request in a queue, receiving a state change signal indicative of a previous user leaving the lavatory, iterating the queue forward by one request in response to the state change signal, and indicating to the next user that the next user's turn to use the lavatory when the request is at the front of the queue. The method can further include verifying a user attempting to enter the lavatory is the user associated with the request that is at the front of the queue.

In this pandemic era, it is desirable to manage the queue at the lavatory (a typical congestion point) and increase social distancing and cleanliness measures. Embodiments can include an automated lavatory latch system with wireless capability, connected through the aircraft Wi-Fi to a server running a module configured to control the occupancy of the lavatories on the aircraft and passengers waiting to use the lavatory. The specific airline's app can incorporate the capability for the passenger to click when they want to use the lavatory, the passenger stays seated until it is their turn in the queue, and the app notifies the passenger which lavatory is ready for their use. In certain embodiments, the passenger can unlock the door with a unique QR code (e.g., only their QR code will work at this point in time). For extra hygiene purposes, the lavatory can be motorized and open automatically once the QR is scanned. Additionally, inside the lavatory a wireless sensor could be incorporated to allow the passenger to close and lock the door without having to touch any surface. When the passenger opens the door when done, a sensor in the door can provide a signal that it is time to notify the next passenger in the queue and the process repeats (e.g., with the door relocking and setting for the next QR code).

In certain embodiments requiring an app, if a passenger doesn't have a smart device, they can notify the flight attendant who could put them in line via their handheld (and perhaps open the door with their device). The crew can also have the capability to lock all lavatory doors during take-off, landing or turbulence, and/or to provide override authority to allow out of turn access. In certain embodiments, the crew can be able to disable the queue system if it is not functioning properly. The system also can be configured to receive flight phase information from the aircraft and automatically seize the queue (e.g., during take-off, landing, or extreme turbulence) or to operate the queue.

As disclosed above, embodiments can organize and/or control the usage of the lavatory. The traditional procedure is to stand in the isle or the galley and wait until your turn, close to others in a tight space. Embodiments solve this issue, and many others, and helps airlines comply with the social distancing measures in effect throughout the world.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A queue system for a lavatory of an aircraft, comprising:
    a queue module configured to receive a request from a user input device and to create and/or modify a virtual lavatory queue based on a request hierarchy of the request to position the request in the virtual lavatory queue; and
    a sensor operatively connected to the queue module and configured to output a state change signal indicative of a user leaving the lavatory, wherein the queue module is configured to:
    receive the state change signal;
    iterate the virtual lavatory queue in response to the state change signal; and
    output a vacancy indicator signal to an indicator device associated with a request that is at a front of the virtual lavatory queue after iterating the virtual lavatory queue to indicate to a next user that it is the next user's turn in the queue; and
    a verification module operatively connected to the queue module and configured to verify a user attempting to use the lavatory is associated with the request that is at the front of the queue, wherein the verification module is configured to receive and compare identification data from the user to stored identification data associated with the request that is at the front of the queue, wherein the identification data includes boarding pass data associated with a user who is associated with the request, or biometric data associated with a user who is associated with the request.

2. The system of claim 1, wherein the user input device is a personal electronic device of a user.

3. The system of claim 2, wherein the indicator device is also the personal electronic device of a user.

4. The system of claim 1, wherein the user input device is a button or switch.

5. The system of claim 1, wherein the user input device and/or indicator device is a passenger infotainment system.

6. The system of claim 4, wherein the indicator device is an indicator light configured to change state when receiving the vacancy indicator signal.

7. The system of claim 1, wherein the sensor is a lavatory door sensor configured to output the state change signal when the lavatory door is unlocked and/or opened after being locked and/or closed.

8. The system of claim 1, wherein the request hierarchy is a time-received logic such that a position of a request is based on a time the request was received such that a later request is further back in the virtual lavatory queue.

9. The system of claim 1, wherein the queue module is hosted on an aircraft network device and configured to receive requests and/or send vacancy indications over an aircraft wireless network.

10. The system of claim 1, further comprising the user input device configured to output a request and the indicator device.

11. The system of claim 10, wherein the user input device and the indicator device are integrated together.

12. The system of claim 1, wherein the verification module is configured to control a lock state and/or an open/close state, wherein if the verification verifies the user attempting to use the lavatory is associated with a request that is at the front of the queue, the verification module is configured to unlock and/or open a lavatory door.

13. A queue system for a lavatory of an aircraft, comprising:
    a user input device configured to output a request to use an aircraft lavatory associated with a user;
    an aircraft network device having a queue module configured to receive the request from the user input device and to create and/or modify a virtual lavatory queue based on a request hierarchy of the request to position the request in the virtual lavatory queue;
    a sensor operatively connected to the queue module and configured to output a state change signal indicative of a user leaving the lavatory; and
    an indicator device associated with each request configured to indicate to a next user that it is the next user's turn in the queue, wherein the queue module is configured to:
    receive the state change signal from the sensor;
    iterate the virtual lavatory queue in response to the state change signal; and output a vacancy indicator signal to the indicator device associated with a request that is at a front of the virtual lavatory queue after iterating the virtual lavatory queue; and a verification module operatively connected to the queue module and configured to verify a user attempting to use the lavatory is associated with the request that is at the front of the queue, wherein the verification module is configured to receive and compare identification data from the user to stored identification data associated with the request that is at the front of the queue, wherein the identification data includes a barcode associated with the request, boarding pass data associated with a user who is associated with the request, or biometric data associated with a user who is associated with the request.

14. The system of claim 13, wherein the user input device and the indicator device are integrated and/or are the same device.

15. A non-transitory computer readable medium having computer executable instructions configured to be executed by a computer to cause the computer to perform a method, the method, comprising:

receiving a request to use an aircraft lavatory from an aircraft occupant;

placing the request in a queue;

receiving a state change signal indicative of a previous user leaving the lavatory;

iterating the queue forward by one request in response to the state change signal;

indicating to the next user that the next user's turn to use the lavatory when the request is at the front of the queue; and verifying a user attempting to use the lavatory is the user associated with the request that is at the front of the queue, wherein verifying includes receiving and comparing identification data from the user to stored identification data associated with the request that is at the front of the queue, wherein the identification data includes a barcode associated with the request, boarding pass data associated with a user who is associated with the request, or biometric data associated with a user who is associated with the request.

16. A queue system for a lavatory of an aircraft, comprising:

a queue module configured to receive a request from a user input device and to create and/or modify a virtual lavatory queue based on a request hierarchy of the request to position the request in the virtual lavatory queue; and a sensor operatively connected to the queue module and configured to output a state change signal indicative of a user leaving the lavatory, wherein the queue module is configured to:

receive the state change signal;

iterate the virtual lavatory queue in response to the state change signal; and output a vacancy indicator signal to an indicator device associated with a request that is at a front of the virtual lavatory queue after iterating the virtual lavatory queue to indicate to a next user that it is the next user's turn in the queue; and a verification module operatively connected to the queue module and configured to verify a user attempting to use the lavatory is associated with the request that is at the front of the queue, wherein the verification module is configured to receive and compare identification data from the user to stored identification data associated with the request that is at the front of the queue, wherein the identification data includes a barcode associated with the request.

\* \* \* \* \*